United States Patent [19]

Polonsky

[11] Patent Number: 4,604,917

[45] Date of Patent: Aug. 12, 1986

[54] EASY-OUT THREADED FASTENER EXTRACTOR

[76] Inventor: Eli Polonsky, 1608 S. Kenton, Aurora, Colo. 80012

[21] Appl. No.: 710,675

[22] Filed: Mar. 12, 1985

[51] Int. Cl.[4] .......................................... B25B 13/50
[52] U.S. Cl. ....................................... 81/53.2; 7/158
[58] Field of Search ................... 81/53.2, 441; 408/22, 408/67; 7/158

[56] References Cited

U.S. PATENT DOCUMENTS 2,947,225  8/1960  Heppner ........................ 408/22 X
3,932,904  1/1976  Nilsson et al. ...................... 7/158
4,218,795  8/1980  Ernst et al. ........................ 7/158

Primary Examiner—James G. Smith
Attorney, Agent, or Firm—N. J. Aquilino

[57] ABSTRACT

An easy-out type threaded fastener extractor combination tool wherein an extractor is combined with a drill head whereby the drilling and extracting operation is performed during the same operation. The extractor is slideable upon the drill bit shaft enabling the drill bit to penetrate within the broken bolt before the extractor engages the bolt. A suitable drive head is provided for a drill chuck or other force producing device.

1 Claim, 6 Drawing Figures

EASY-OUT THREADED FASTENER EXTRACTOR

BACKGROUND OF THE INVENTION

The present invention relates to extractors for removing broken threaded fasteners such as broken bolts, and more particularly to a broken bolt extractor combined with a drill head in a single combination tool.

Conventional easy-out type bolt extractors for extracting broken bolts within a threaded bore normally are formed of a pointed tool having gripping teeth or shaped flutes adpated to engage the sides of a bore drilled through the broken bolt. The gripping surfaces are shaped to engage the bore when the extractor is rotated in a direction opposite that of the bolt threads so that rotation of the extractor unthreads the broken bolt and removes it from the threaded bore. These extractors require that a hole first be drilled through the broken bolt prior to the insertion of the bolt extractor within the bolt. One of the shortcomings of these tools is that the drill bit is often broken in the process of drilling which results in a compound problem of removal, requiring removal of both the broken bolt and the broken drill bit. Even when the drill bit is not broken, it often drives the bolt deeper into the threaded hole making extraction more difficult. This process requires that the drill bit be removed before inserting the bolt extractor so that at least three separate operations are needed, namely, drilling of a bore within the broken bolt, removing of the drill bit, and inserting the extractor and extracting the bolt.

With the present invention, the drill bit and the bolt extractor are combined in a single tool. The lower surface of the tool is provided with the drill bit which has a cutting edge with a pitch in the direction opposite to the threads of the bolt bore. A bolt extractor is reciprocally mounted on the drill bit shaft above the drill bit. The top of the tool includes a drive head which is adapted to coact with a power or hand drill or other suitable driving means. The lower end of the drive head includes a coupling means which contacts a mating pottion on the top of the reciprocally moveable bolt extractor in order to engage the bolt extractor with the drive head after the tool has been drilled a predetermined length into the broken bolt. Once the bolt extractor is engaged with the drive head, the extractor then proceeds to grip the inside of the drilled out bore to enable the broken bolt to be extracted.

Among the objects of the present invention are the provision of a threaded fastener extractor tool which is combined with a drilling bit so that a broken bolt may be removed in a single operation.

DESCRIPTION OF THE PREFERRED EMBODIMENTS

Figure 1:
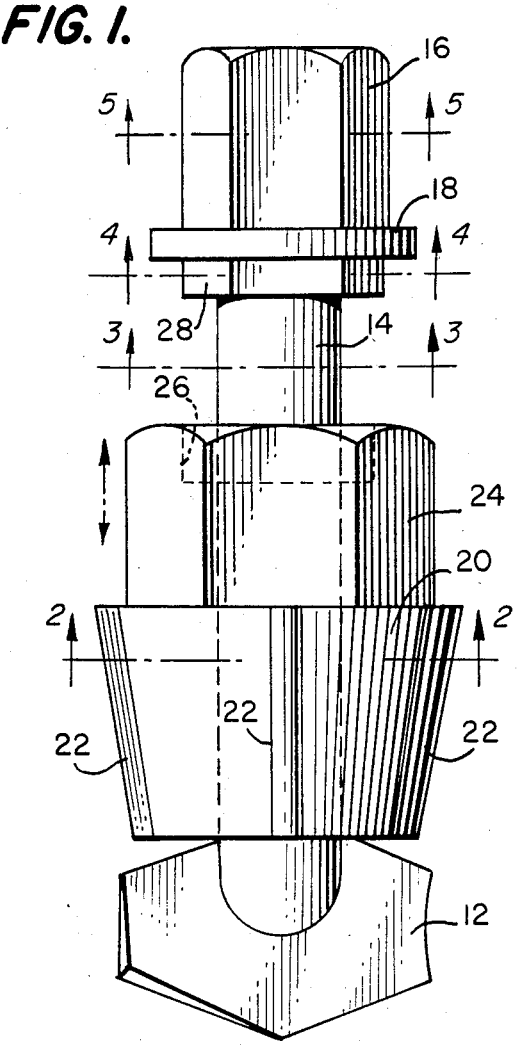
FIG. 1 is an elevational view of the bolt extractor of the present invention.

FIGS. 1 through 5 illustrate one embodiment of the easy-out type of bolt extractor tool of the present invention. Assuming the broken bolt to be removed has right hand threads, the bolt extractor 10 is provided with a left-hand drill bit 12 mounted on a shaft 14. The opposite end is formed with an integral drive head 16 which is adapted to be inserted into a suitable driving means such as a power drill chuck or wrench. The drive head 16 includes an annular flange 18 which provides a surface against which a drive means rests to provide stability. The extractor 20 is a cylindrical sleeve formed with a plurality of teeth 22 which are spated to grip an interior bore surface when rotated in a left-hand thread or counter-clockwise direction. The upper portion of the extractor 20 is provided with a hexagonal socket 24 so that it may be directly gripped by a power drill, a wrench or other suitable tool. The extractor 20 is reciprocally and rotatably mounted upon the shaft 14 so that as the drill bit 12 penetrates a broken bolt forming a bore, the extractor 20 moves upwardly. The socket 24 on the extractor is also provided with an interior socket hole 26 which is hexagonal in shape and which cooperates with another hexagonal socket 28 formed on the bottom of the drive head 16. In this manner, the extractor 20 moves vertically up the shaft 14 as the drill bit 12 is turned within the broken bolt until it penetrates to a point where the socket 28 engages the socket opening 26. At that time, the extractor 20 and drill bit 12 rotate together, being driven by the same drive head 16.

In most cases, continued driving of the drive head 16 in a counter-clockwise direction will cause the teeth 22 of the extractor 20 to grip the inside wall of the bore within the broken bolt formed by the drill bit 12 and cause the broken bolt to turn thereby extracting itself. Alternately, a heavy duty tool can engage the socket 24 to directly drive the extractor 20 to remove the broken bolt.

Figure 6:
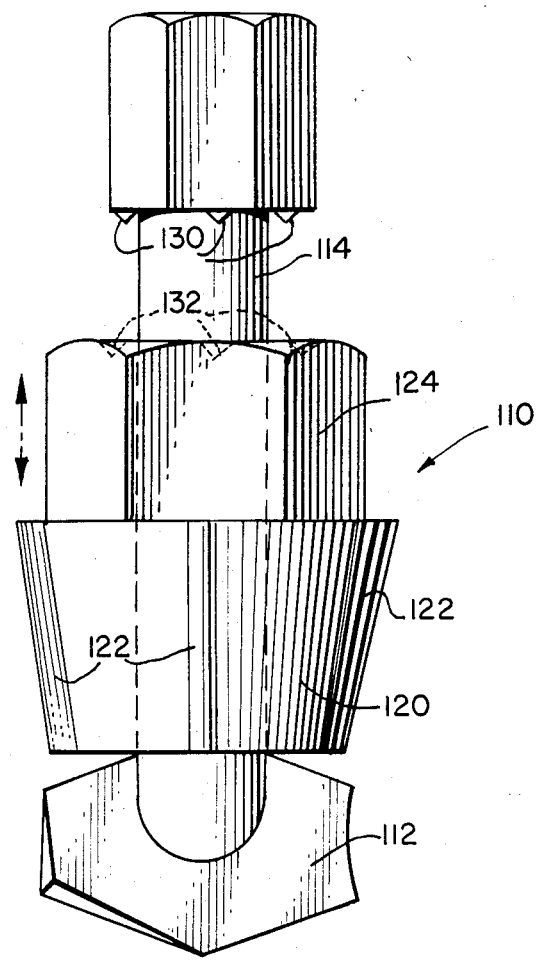
FIG. 6 is an elevational view of an alternate embodiment of the present invention.
Figure 2:
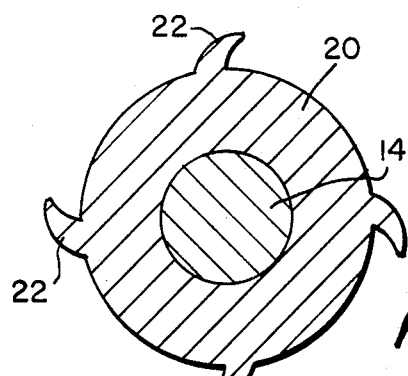
FIG. 2 is a sectional view taken along line 2—2 of FIG. 1.
Figure 3:
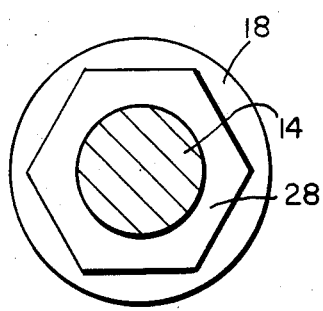
FIG. 3 is a sectional view taken along line 3—3 of FIG. 1.
Figure 4:
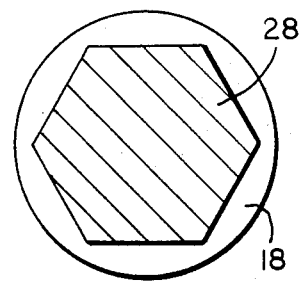
FIG. 4 is a sectional view taken along line 4—4 of FIG. 1.
Figure 7:
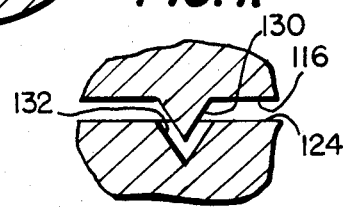
FIG. 7 is a partial sectional view of a detail of FIG. 6.
Figure 5:
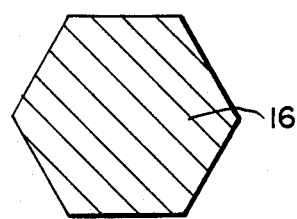
FIG. 5 is a sectional view taken along line 5—5 of FIG. 1.

An alternate embodiment of the present invention is shown in FIG. 6. An extractor tool 110 is provided with a drill bit 112, a shaft 114, a drive head 116, and an extractor 120 which are the same elements as described in the embodiment of FIGS. 1 through 5. In this arrangement, a slip clutch is provided between the drive head 116 and the socket 124 of the extractor 120. As seen in FIG. 7, the bottom of the drive head is provided with a series of downwardly projections 130 which cooperate with a series of depressions 132 in the top of the drive socket 124. Preferably, the projections 130 and the corresponding depressions 132 are conical in shape, although it will be appreciated that any suitable matching shapes could be used. This arrangement acts as a slip clutch so that the extractor 120 is driven by the drive head 116 after the extractor 120 moves vertically on the shaft 114 as the drill bit 112 penetrates within the broken bolt in the same manner as described with respect to the tool of FIGS. 1 to 5.

It will be appreciated that other embodiments of the present invention are contemplated within the scope of the appended claims.

What I claim is:

1. A combination tool for extracting broken threaded fasteners from a threaded bore comprising; drill means for forming a bore in said broken fastener, shaft means attached to said drill means, drive means attached to said shaft means opposite said drill means, extractor means rotatably and reciprocally moveable on said shaft means and coupling means for coupling said extractor means to said drive means, said coupling means formed of a plurality of projections on said drive means and a plurality of projections receiving openings on said extractor means; whereby, in use, a bore is drilled in said broken fastener by said drill means while permitting movement between said drill means and said extractor means allowing said drill means to penetrate said broken fastener to a predetermined depth before said coupling means engages said drive means and said extractor means causing said extractor means to be driven by said drive means to engage the interior of said bore to extract said broken fastener.

* * * * *